US010969861B2

(12) United States Patent
Hasegawa

(10) Patent No.: US 10,969,861 B2
(45) Date of Patent: Apr. 6, 2021

(54) IMAGE PROCESSING DEVICE, IMAGE PROCESSING METHOD, AND IMAGE SYSTEM

(71) Applicant: SONY CORPORATION, Tokyo (JP)

(72) Inventor: Yuichi Hasegawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/480,857

(22) PCT Filed: Feb. 9, 2018

(86) PCT No.: PCT/JP2018/004567
§ 371 (c)(1),
(2) Date: Jul. 25, 2019

(87) PCT Pub. No.: WO2018/155233
PCT Pub. Date: Aug. 30, 2018

(65) Prior Publication Data
US 2019/0384382 A1    Dec. 19, 2019

(30) Foreign Application Priority Data
Feb. 23, 2017    (JP) .............................. JP2017-032021

(51) Int. Cl.
*G06F 3/01*    (2006.01)
*G06F 3/0481*    (2013.01)
(Continued)

(52) U.S. Cl.
CPC ............ *G06F 3/012* (2013.01); *A63F 13/525* (2014.09); *A63F 13/833* (2014.09); *G06F 3/013* (2013.01);
(Continued)

(58) Field of Classification Search
CPC ............................ G06F 3/011; G06F 3/04815
See application file for complete search history.

(56) References Cited

U.S. PATENT DOCUMENTS

| 2017/0108922 A1* | 4/2017 | Terahata ................. G06F 3/011 |
| 2019/0317595 A1* | 10/2019 | Nakata .................... G06T 19/00 |
| 2019/0353298 A1* | 11/2019 | Okumura ............... H04N 5/232 |

FOREIGN PATENT DOCUMENTS

| JP | 2010-257081 A | 11/2010 |
| JP | 2016-031439 A | 3/2016 |
| WO | WO 2016/042862 A1 | 3/2016 |

OTHER PUBLICATIONS

Jan. 24, 2020, European Search Report issued for related EP Application No. 18756564.3.

* cited by examiner

*Primary Examiner* — Sepehr Azari
(74) *Attorney, Agent, or Firm* — Paratus Law Group, PLLC

(57) ABSTRACT

There is provided an image processing device, an image processing method, and an image system capable of reducing discomfort of a user, such as "VR sickness." The image processing device includes: an image generation unit configured to generate an avatar viewpoint image according to a viewpoint of an avatar corresponding to a user in a virtual world as a first presentation image to be presented to the user, and generate a second presentation image different from the avatar viewpoint image in a case in which posture difference occurs between an actual posture of the user based on a result of detecting motion of the user and a posture of the avatar. The present technique is applicable, for example, to an image processing device etc. for generating an image to be displayed on a head mounted display.

13 Claims, 7 Drawing Sheets

(51) Int. Cl.
*A63F 13/525* (2014.01)
*A63F 13/833* (2014.01)
*G06T 15/20* (2011.01)

(52) U.S. Cl.
CPC ...... *G06T 15/20* (2013.01); *A63F 2300/8082* (2013.01)

IMAGE PROCESSING DEVICE, IMAGE PROCESSING METHOD, AND IMAGE SYSTEM

CROSS REFERENCE TO PRIOR APPLICATION

This application is a National Stage Patent Application of PCT International Patent Application No. PCT/JP2018/004567 (filed on Feb. 9, 2018) under 35 U.S.C. § 371, which claims priority to Japanese Patent Application No. 2017-032021 (filed on Feb. 23, 2017), which are all hereby incorporated by reference in their entirety.

TECHNICAL FIELD

The present technique relates to an image processing device, an image processing method, and an image system. In particular, the present technique relates to an image processing device, an image processing method, and an image system capable of reducing discomfort of a user, such as "VR sickness."

BACKGROUND ART

In recent years, head-mounted displays and head-up displays have become capable of presenting images with a wide viewing angle. By changing/following (tracking) a direction and a posture of the image to be displayed naturally in response to the posture of the body or head, more realistic first-person viewpoint experiences are becoming feasible. The first-person viewpoint, which is particularly called first-person shooting (F.P.S.) in the video game world, is becoming popular.

On the other hand, it is known that some users may experience discomfort called "VR sickness" or "video sickness" when experiencing virtual reality (VR) using a head mounted display or a head up display. This discomfort is said to occur when there is a gap between the sense that the user feels or the user predicts from the experience and the actual sense (e.g., visual stimulation).

Contrivance for reducing the discomfort of this "VR sickness" or "video sickness" has been proposed (see, for example, PTL 1).

CITATION LIST

Patent Literature

[PTL 1]
JP 2016-31439A.

SUMMARY

Technical Problem

However, measures against such discomfort of "VR sickness" etc. are further required.

The present technique has been made in view of such a situation, and is intended to be able to reduce the discomfort of the user such as "VR sickness."

Solution to Problem

An image processing device according to one aspect of the present technique includes animate generation unit configured to generate an avatar viewpoint image according to a viewpoint of an avatar corresponding to a user in a virtual world as a first presentation image to be presented to the user, and generate a second presentation image different from the avatar viewpoint image in a case in which a posture difference occurs between an actual posture of the user based on a result of detecting motion of the user and a posture of the avatar.

An image processing method according to one aspect of the present technique includes the step of: by an image processing device, generating an avatar viewpoint image according to a viewpoint of an avatar corresponding to a user in a virtual world as a first presentation image to be presented to the user and generating a second presentation image different from the avatar viewpoint image in a case in which a posture difference occurs between an actual posture of the user based on a result of detecting motion of the user and a posture of the avatar.

An image system according to one aspect of the present technique includes an image generation unit configured to generate an avatar viewpoint image according to a viewpoint of an avatar corresponding to a user in a virtual world as a first presentation image to be presented to the user, and generate a second presentation image different from the avatar viewpoint image in a case in which a posture difference occurs between an actual posture of the user based on a result of detecting motion of the user and a posture of the avatar; and a display unit configured to display the first presentation image and the second presentation image.

In one aspect of the present technique, an avatar viewpoint image is generated according to a viewpoint of an avatar corresponding to a user in a virtual world as a first presentation image to be presented to the user, and a second presentation image different from the avatar viewpoint image is generated in a case in which a posture difference occurs between the actual posture of the user based on a result of detecting motion of the user and a posture of the avatar.

Note that the image processing device according to one aspect of the present technique may be achieved by causing a computer to execute a program.

In addition, in order to achieve the image processing device according to one aspect of the present technique, the program to be executed by the computer may be provided by transmitting via a transmission medium or recording on a recording medium.

The image processing device may be an independent device or an internal block constituting one device.

Advantageous Effect of Invention

According to one aspect of the present technique, the discomfort of the user such as "VR sickness" may be reduced.

In addition, the effect described here is not necessarily limited, and may be any effect described in the present disclosure.

DESCRIPTION OF EMBODIMENTS

Hereinafter, a mode for carrying out the present technique (hereinafter, referred to as an embodiment) will be described.

<Exemplary Configuration of an Image System>

Figure 1:
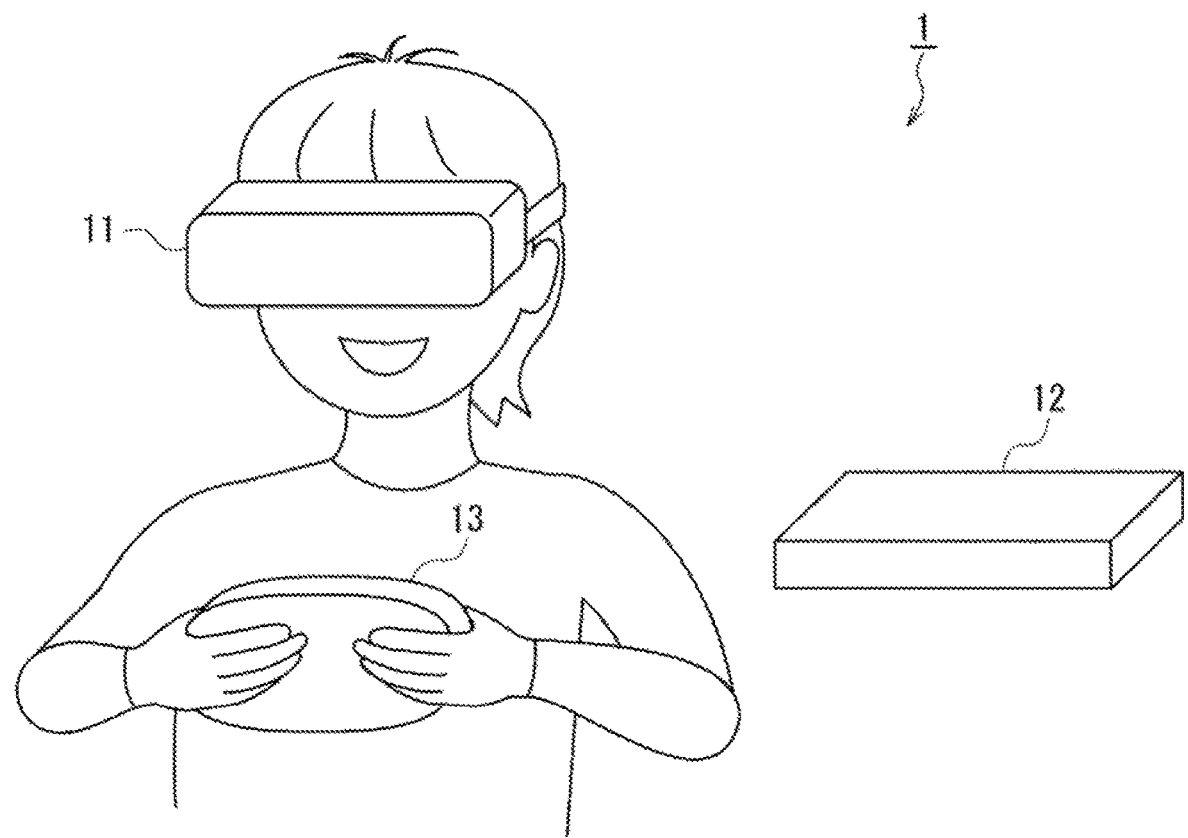
FIG. 1 illustrates an exemplary configuration of an embodiment of an image system to which the present technique is applied.

FIG. 1 illustrates an exemplary configuration of an embodiment of an image system to which the present technique is applied.

The image system 1 of FIG. 1 includes a head mounted display 11 (hereinafter, referred to as an HMD 11), an image processing device 12, and a controller 13.

The HMD 11 displays an image in the virtual world generated by the image processing device 12 to present it to a user. The image processing device 12 generates an image to be displayed on the HMD 11 to provide it to the HMD 11. The controller 13 includes a plurality of handling buttons (not illustrated), receiving handling of the user to provide the image processing device 12 with a predetermined instruction in response to the handling of the user.

A wired cable such as HDMI (High Definition Multimedia Interface) or MHL (Mobile High-definition Link), or wireless communication such as Wi-Fi (Wireless Fidelity), wireless HD or Miracast, for example, connects between the HMD 11 and the image processing device 12, and between the image processing device 12 and the controller 13.

Figure 2:
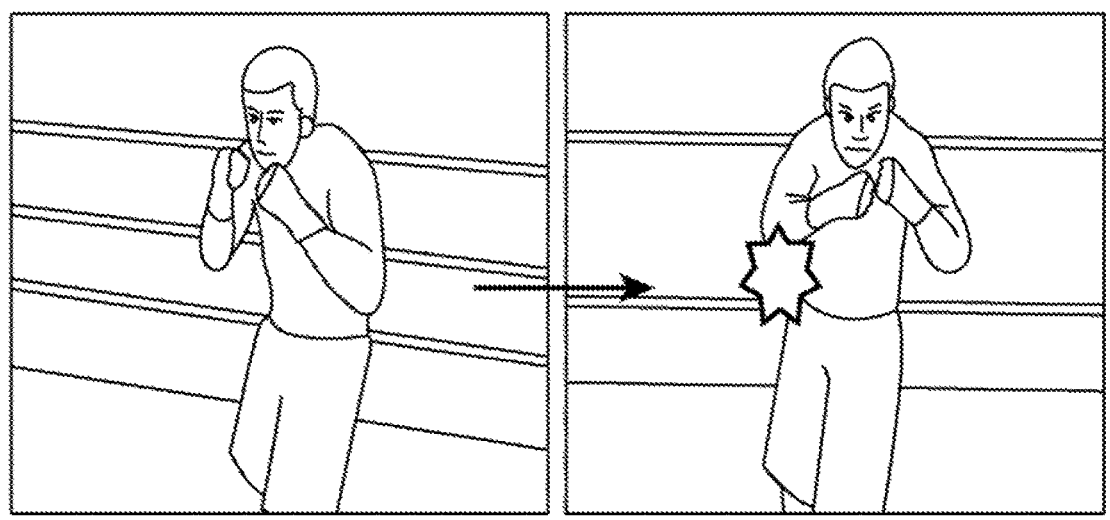
FIG. 2 illustrates an example of a content image of a boxing game.

In the present embodiment, for example, the image processing device 12 causes an image as illustrated in FIG. 2 to be displayed. The image in FIG. 2 illustrates an image of a first-person viewpoint boxing game (content) in which the user wearing the HMD 11 is a player. The image displayed on the HMD 11 may be a 2D image. This image may also be a 3D image, which enables three-dimensional visual recognition by displaying a right-eye image for presenting to the user's right eye and a left-eye image for presenting to the user's left eye.

In the image system 1 configured as described above, the image processing device 12 generates an image and cause the HMD 11 to display the image so as to reduce discomfort such as "VR sickness" in a state in which the user visually recognizes the image displayed on the HMD 11 and experiences the virtual world.

In addition, the HMD 11, the image processing device 12, and the controller 13 may be combined as needed, and the image system 1 may be configured by one or two devices.

<Detailed Exemplary Configuration of an Image System>

Figure 3:
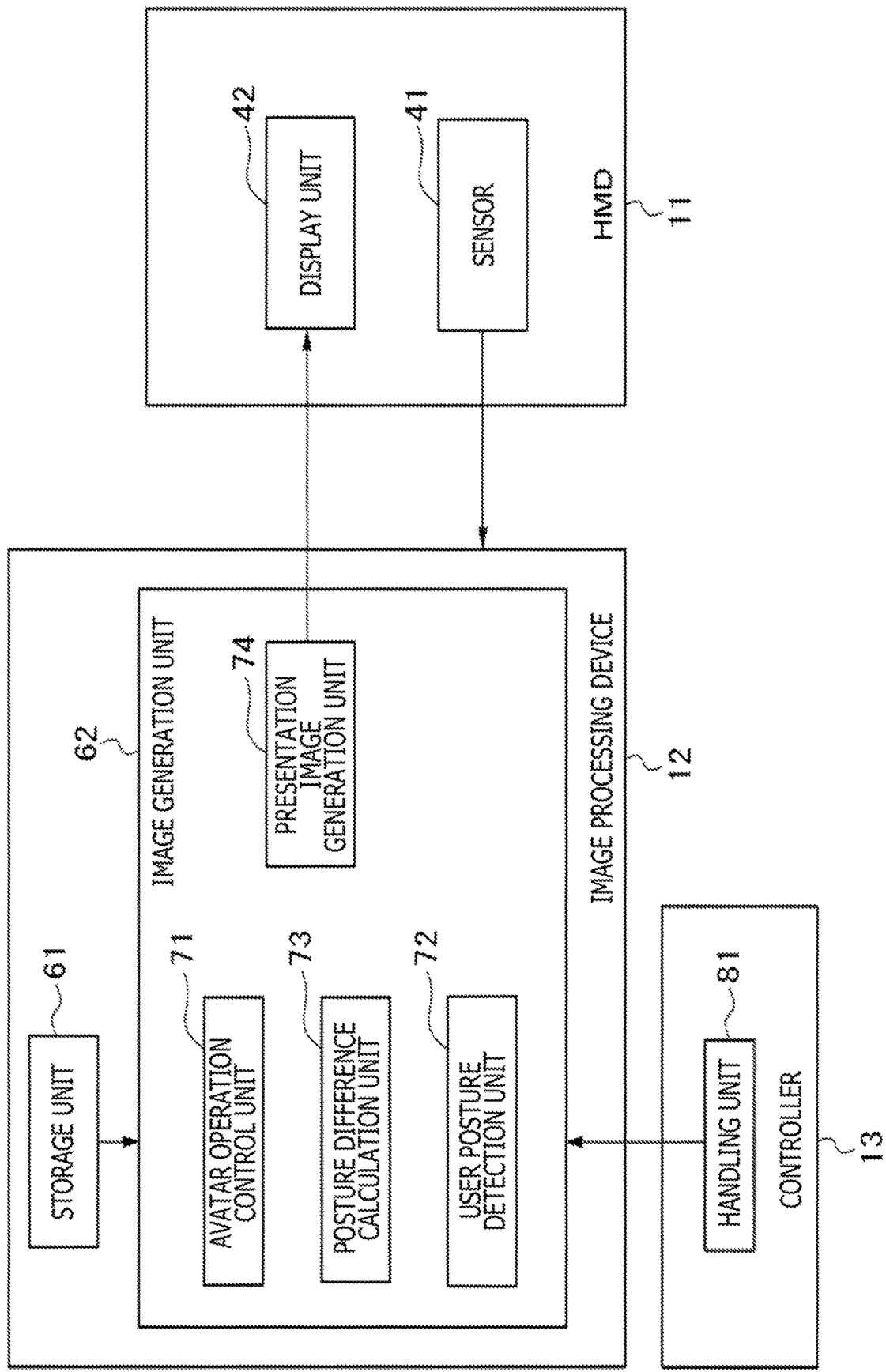
FIG. 3 illustrates a block diagram representing a detailed exemplary configuration of the imaging system of FIG. 1.

FIG. 3 illustrates a block diagram representing a detailed exemplary configuration of the imaging system 1.

The HMD 11 includes a sensor 41 and a display unit 42.

The sensor 41 includes, for example, a combination of one or more sensor elements such as a gyro sensor, an acceleration sensor, and a geomagnetic sensor, to detect the position and direction of the head of the user. In the present embodiment, the sensor 41 is assumed to include a sensor capable of detecting a total of nine axes of a three-axis gyro sensor, a three-axis acceleration sensor, and a three-axis geomagnetic sensor. The sensor 41 provides the detected result to the image processing device 12.

The display unit 42 includes, for example, an organic EL (Electro-Luminescence) element, a liquid crystal display, etc., and displays a predetermined image on the basis of an image signal provided from the image processing device 12.

In addition, the HMD 11 may have a speaker that outputs sound, a microphone that acquires the sound of the user, etc.

The controller 13 includes a handling unit 81 including a plurality of handling buttons, receiving the handling of the user to provide the image processing device 12 with a predetermined instruction in response to the handling of the user.

The image processing device 12 includes at least a storage unit 61 and an image generation unit 62. The image generation unit 62 includes an avatar operation control unit 71, a user posture detection unit 72, a posture difference calculation unit 73, and a presentation image generation unit 74.

The storage unit 61 includes, for example, a hard disk, a non-volatile memory, etc., and stores programs for controlling the operation of the image processing device 12 and contents (programs) for displaying an image on the HMD 11, etc.

The avatar operation control unit 71 controls the operation (posture) of an avatar corresponding to the user in the image (content image) in the virtual world displayed on the display unit 42. The control of the operation (posture) of the avatar also takes into consideration the real posture of the user (the actual posture of the user) detected by the user posture detection unit 72. The operation of the avatar changes, for example, in the content image of the virtual world displayed on the display unit 42, depending on the operation selected by the user, the action performed by the user, etc.

As an opponent in the boxing game illustrated in FIG. 2, the avatar operation control unit 71 also controls, for example, the operation (posture) of an avatar of another user in a case in which an avatar other than the player appears in the image displayed on the display unit 42. In the following, in order to distinguish the avatar of the user from the avatar of another user, in a case in which the avatar of another user is intended, it is referred to as another avatar, and in the case of simply referring to as an avatar, at means the user's own avatar.

The user posture detection unit 72 detects the actual posture of the user on the basis of the detection result of the position and direction of the head of the user provided from the sensor 41.

The posture difference calculation unit 73 calculates the a posture difference between the posture of the avatar determined by the avatar operation control unit 71 and the actual posture of the user detected by the user posture detection unit 72.

The presentation image generation unit 74 generates a presentation image to be presented to the user, which is an image of the content acquired from the storage unit 61, and provides the presentation image to the display unit 42. The presentation image is generated on the basis of the operation of the user's own avatar and another avatar determined by the avatar operation control unit 71, the actual posture of the user determined by the user posture detection unit 72, and the posture difference determined by the posture difference calculation unit 73 between the posture of the avatar and the actual posture of the user. In a normal scene, the presentation image generation unit 74 aligns the posture of the avatar with the actual posture of the user, and generates a presentation image (first presentation image) such that an image according to the viewpoint of the avatar is presented to the user. Under a predetermined condition, in order to reduce the discomfort of the user such as "VR sickness," as image different from the image of the avatar viewpoint is generated as a presentation image (second presentation image) and causes the display unit 42 to display the image.

Description of the Presentation Image>

The presentation image generated by the presentation image generation unit 74 will be further described with reference to FIGS. 4 and 5.

Figure 4:
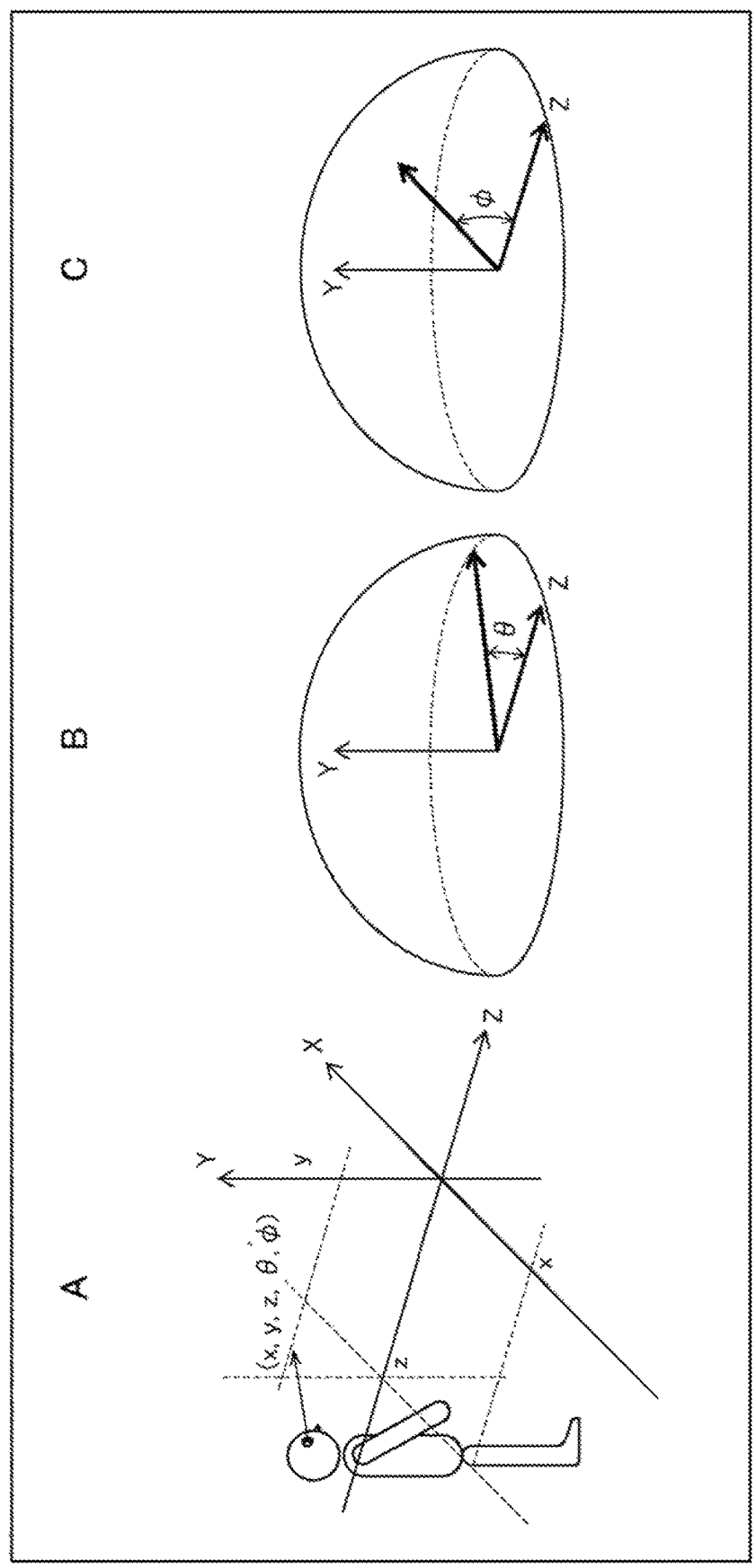
FIG. 4 illustrates a figure explaining a coordinate system of a virtual world.

First, FIG. 4 describes the virtual world in the content displayed on the display unit 42 and a coordinate system that expresses the posture of the avatar on the virtual world.

Assuming that the virtual world in the content displayed on the display unit 42 is a three-dimensional space including the X axis, Y axis, and Z axis as illustrated in A of FIG. 4, the posture of the avatar may be expressed by five parameters $(x, y, z, \theta, \varphi)$ which includes a three-dimensional position $(x, y, z)$ and a two-dimensional direction $(\theta, \varphi)$.

Here, the three-dimensional position $(x, y, z)$ corresponds to the position of the head of the avatar on the virtual world, and the two-dimensional direction $(\theta, \varphi)$ corresponds to a gaze direction. (head direction) of the avatar on the virtual world. As illustrated in B of FIG. 4, the direction $\theta$ is a so-called azimuth angle, which is formed by the gaze direction with respect to a predetermined reference axis (Z axis in the example of FIG. 4B) on the XZ plane. As illustrated in C of FIG. 4 the direction $\varphi$ is a so-called elevation angle, which is an angle in the Y-axis direction formed by the gaze direction with respect to the XZ lane. Therefore, the posture in the present specification includes not only the head position on the virtual world but also the gaze direction.

In the virtual world of the content displayed on the display unit 42, three postures of the user posture $pos_u$, the avatar posture $pos_a$, and the presentation image posture $pos_v$ are defined as follows.

user posture $pos_u = (x_u, y_u, z_u, \theta_u, \varphi_u)$ avatar posture $pos_a = (x_a, y_a, z_a, \theta_a, \varphi_a)$ presentation image posture $pos_v = (x_v, y_v, z_v, \theta_v, \varphi_v)$ The user posture $pos_u$ is a projection of the actual posture of the user determined by the detection result provided from the sensor 41 on the virtual world. The avatar posture $pos_a$ is a posture of the avatar expressed by coordinates on the virtual world. The presentation image posture $pos_v$ is a virtual posture corresponding to the presentation image displayed on the display unit 42.

Figure 5:
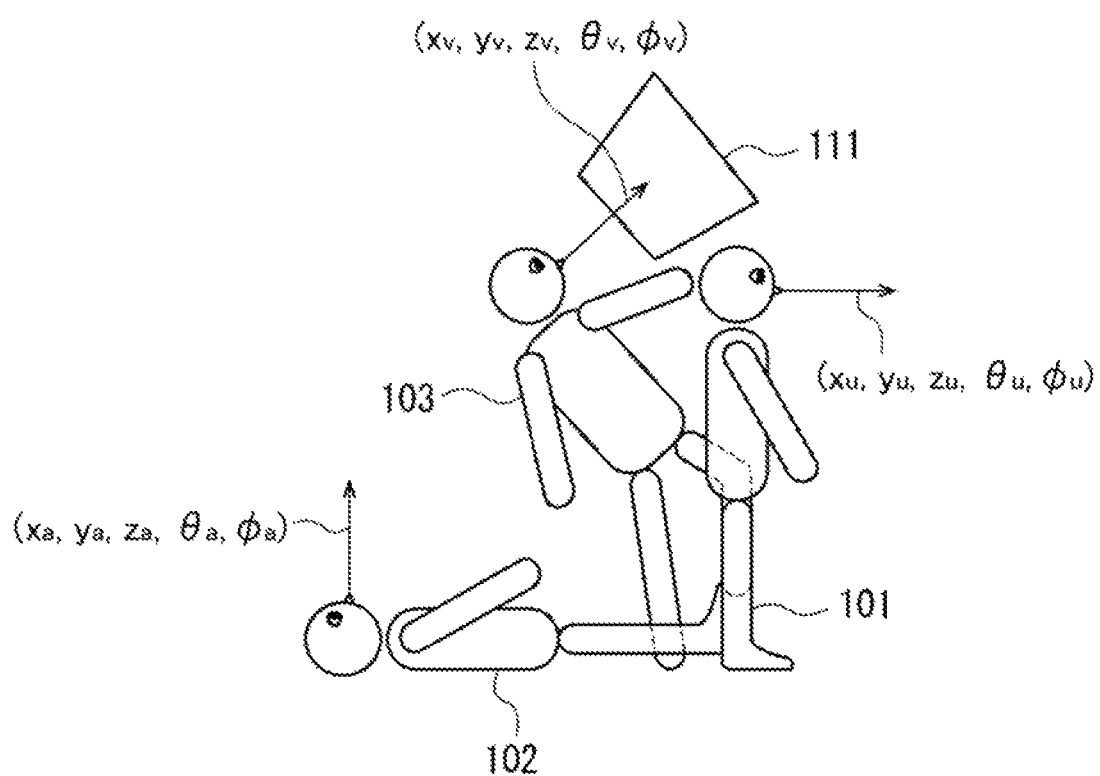
FIG. 5 illustrates a figure explaining three postures including a user posture, an avatar posture, and a presentation image posture.

FIG. 5 specifically describes the three postures of the user posture $pos_u$, the avatar posture $pos_a$, and the presentation image posture $pos_v$.

These three postures are described using an example of the content of the boxing game illustrated in FIG. 2.

For example, since the posture of the avatar is controlled according to the actual posture of the user detected by the user posture detection unit 72 in a normal scene, the avatar posture $pos_a$ and the user posture $pos_u$ are the same. That is, avatar posture $pos_a$=user posture $pos_u$. Further, since the presentation image displayed on the display unit 42 is an image of the virtual world from the viewpoint of the avatar, presentation image posture $pos_v$=avatar posture $pos_a$.

Therefore, in the normal scene where the special process to reduce "VR sickness" is not performed, presentation image posture $pos_v$=avatar posture $pos_a$=user posture $pos_u$.

Then, an example is described assuming the scene where the avatar is on the canvas (falling to the ground) by the opponent's punch.

Assuming that the actual user does not fall to the ground and stands up as in a posture 101 of FIG. 5, the user posture $pos_u$ calculated by the user posture detection unit 72=$(x_u, y_u, z_u, \theta_u, \varphi_u)$ has the posture 101.

By contrast, the avatar posture $pos_a=(x_a, y_a, z_a, \theta_a, \varphi_a)$ controlled by the avatar operation control unit 71 has a posture 102 in which the avatar falls to the ground as illustrated in FIG. 5.

In a normal scene, as described above, the image of the virtual world from the viewpoint of the avatar is used as the presentation image. However, if the presentation image is greatly changed in accordance with rapid movement of the avatar, the user may cause possible "VR sickness."

Therefore, the presentation image generation unit 74 generates not the image corresponding to the avatar posture $pos_a$ (the posture 102 in FIG. 5) but, for example, an image 111 corresponding to a posture 103 close to the actual posture of the user (the posture 101 in FIG. 5) as a presentation image, and causes the display unit 42 to display the image 111. The image 111 as the presentation image is an image whose view change is more gradual than the image corresponding to the avatar posture $pos_a$. The posture 103 corresponding to the image 111 to be the presentation image is the presentation image posture $pos_v=(x_v, y_v, z_v, \theta_v, \varphi_v)$.

In the scene of the example of FIG. 5 subjected to the process for reducing VR sickness, the presentation image posture posy is different from any posture of the avatar posture $pos_a$ and the user posture $pos_u$, but it is sufficient that the presentation image is an image different from an avatar viewpoint image that is at least the presentation image in the normal scene. For example, the presentation image may be an image corresponding to the actual posture of the user.

<Presentation Image Generation Process>

Figure 6:
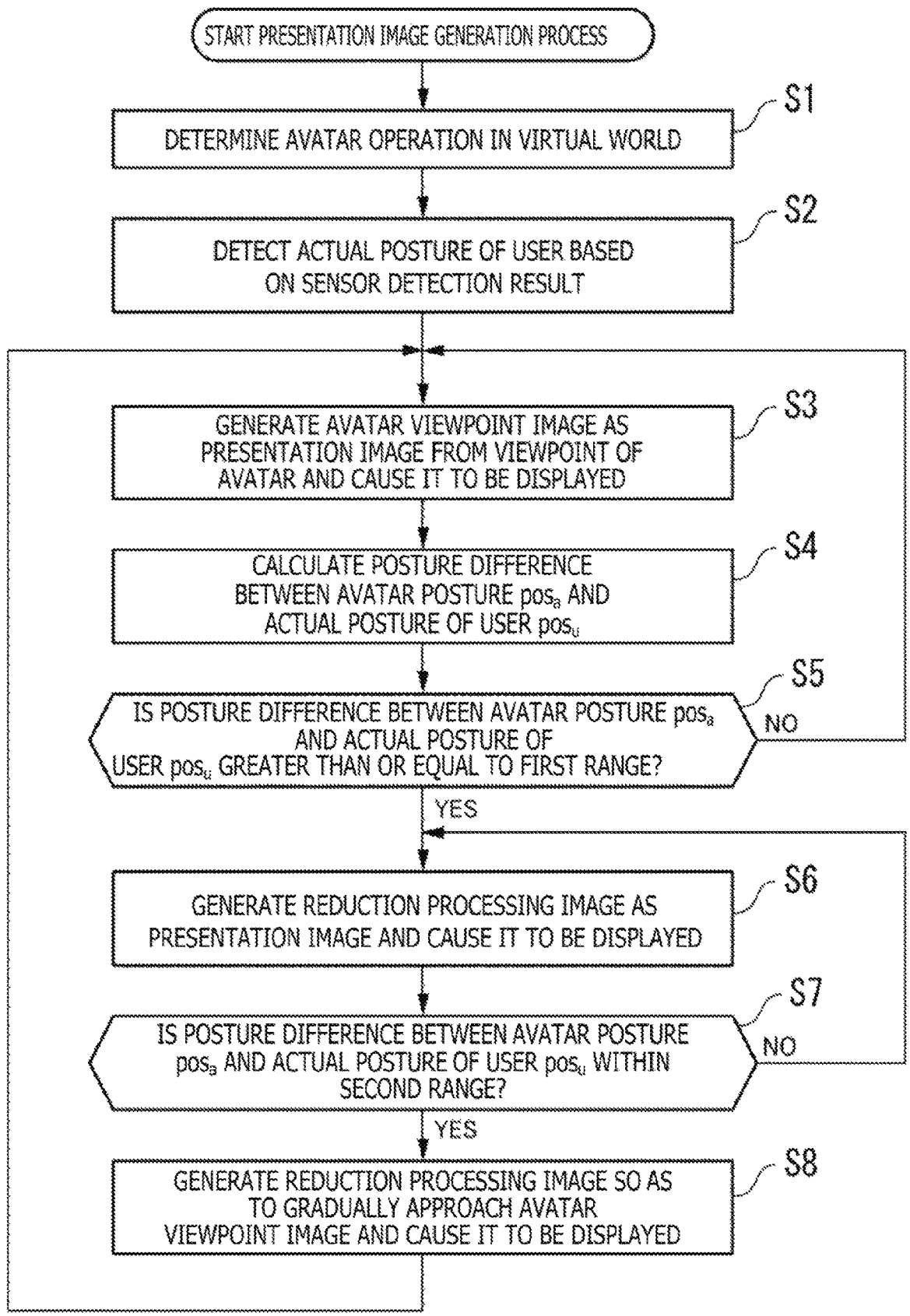
FIG. 6 illustrates a flowchart explaining a presentation image generation process.

Then, with reference to a flowchart of FIG. 6, described is a presentation image generation process by the image processing device 12. This process is started, for example, when handling is performed to cause the display unit 42 of the HMD 11 to display a predetermined content image.

First, in step S1, the avatar operation control unit 71 determines the operation of the avatar (avatar posture $pos_a$) in the virtual world displayed on the display unit 42. In a case in which another avatar other than the player himself appears in the virtual world, the avatar operation control unit 71 also determines the operation (posture) of another avatar. After step S1, determination of the operation of the avatar is always executed according to the content.

In step S2, the user posture detection unit 72 detects the actual posture $pos_u$ of the user on the basis of the sensor detection result indicating the position and direction of the head of the user provided from the sensor 41. Thereafter, the detection of the actual posture $pos_u$ of the user based on the sensor detection result is also constantly executed. The detected actual posture $pos_u$ of the user is provided to the avatar operation control unit 71, and the operation (posture) of the avatar is matched to the operation of the user.

In step S3, the presentation image generation unit 74 generates an avatar viewpoint image that is an image from the viewpoint of the avatar, as a presentation image, providing the generated avatar viewpoint image to the display unit 42 of the HMD 11 to cause the display unit 42 to display the supplied image. The presentation image posture $pos_v$ here is equal to the avatar posture $pos_a$ and the user posture $pos_u$ (presentation image posture $pos_v$=avatar posture $pos_a$=user posture $pos_u$).

In step S4, the posture difference calculation unit 73 calculates a posture difference between the avatar posture $pos_a$ determined by the avatar operation control unit 71 and the actual posture $pos_u$ of the user detected by the user posture detection unit 72, and provide the calculated posture difference to the presentation image generation unit 74.

In step S5, the presentation image generation unit 74 determines whether the posture difference between the avatar posture $pos_a$ and the actual posture $pos_u$ of the user is equal to or greater than a predetermined first range.

Here, when, as a first range in step S5, the threshold $thres_\theta$ of the azimuth angle $\theta$ and the threshold $thres_\varphi$ of the elevation angle $\varphi$ are set, and either condition of the following equation (1) or equation (2) is satisfied, the presentation image generation unit 74 may determine that the posture difference between the avatar posture $pos_a$ and the actual posture $pos_u$ of the user is equal to or greater than the first range. In the equation (1) and the equation (2), $|d|$ represents the absolute value of d.

$$|\theta_a-\theta_u|>thres_\theta \quad (1)$$

$$|\varphi_a-\varphi_u|>thres_\varphi \quad (2)$$

In the equation (1), $thres_\theta$ is a threshold of the azimuth angle $\theta$, and $thres_\varphi$ in the equation (2) is a threshold of the elevation angle $\varphi$. The threshold $thres_\theta$ and the threshold $thres_\varphi$ may be set to any value, and for example, may be set to 30 degrees. This numerical value of 30 degrees is a value where the average human moves the gaze direction by moving only the eyeball when looking at an object that is off the front within 30 degrees, while the average human performs head motion naturally when looking at an object in a direction that is further out of 30 degrees.

In addition, in the case of using severe determination conditions for preventing sickness, the threshold $thres_\theta$ and the threshold $thres_\varphi$ may be set to one degree. This is because the range of the central retinal area, called the fovea used to focus on the details of things, is said to be approximately one degree in an average human. The threshold $thres_\theta$ and the threshold $thres_\varphi$ may be changed to the values desired by the user using a setting screen, etc. Changing these threshold values enables to control the degree for preventing sickness.

The above-described determination condition is mainly the condition that determines that the head direction has been moved. In a case in which such a condition that the avatar may be greatly moved with its entire body is also taken into consideration, the condition of the following equation (3) can be added to the conditions of equation (1) and equation (2). That is, when any one of the equations (1) to (3) is satisfied, the posture difference between the avatar posture $pos_a$ and the actual posture $pos_u$ of the user is determined to be equal to or greater than the first range.

$$\Delta x_{au}>thres_x \quad (3)$$

In the equation (3), $\Delta x_{au}$ represents a difference between the head position $(x_u, y_u, z_u)$ of the actual posture $pos_u$ of the user and the head position $(x_a, y_a, z_a)$ of the avatar posture $pos_a$. The two-dimensional norm of the equation (4) or the one-dimensional norm of the equation (5) may be adopted as $\Delta x_{au}$. In the equation (3), $thres_x$ represents the threshold of $\Delta x_{au}$.

[Math. 1]

$$\Delta x_{au}=\sqrt{(x_u-x_a)^2+(y_u-y_a)^2+(z_u-z_a)^2} \quad (4)$$

$$\Delta x_{au}=|x_u-x_a|+|y_u-y_a|+|z_u-z_a| \quad (5)$$

A moving speed of the head position of the avatar or an angular velocity in the gaze direction may be used as the determination condition in the other step S5. Specifically, assuming that the angular velocity in the gaze direction $(\theta_a, \varphi_a)$ of the avatar is $\Delta\theta$ and $\Delta\varphi$, and a time change amount (moving velocity) of the head position $(x_a, y_a, z_a)$ of the avatar is $v_a$, the posture difference between the avatar posture $pos_a$ and the actual posture $pos_u$ of the user may be determined to be equal to or greater than the first range when any one of the equations (6) to (8) is satisfied, $$|\Delta\theta_a-\Delta\theta_u|>thres_{\Delta\theta} \quad (6)$$

$$|\Delta\varphi_a-\Delta\varphi_u|>thres_{\Delta\varphi} \quad (7)$$

$$v_a>thres_v \quad (8)$$

Furthermore, in step S5, it may be configured that, when a phenomenon in which the posture difference between the avatar posture $pos_a$, and the actual posture $pos_u$ of the user is determined to be equal to or greater than the first range occurs not only one time but also a predetermined number of times or more, or occurs continuously for a predetermined period of time, the posture difference may be also determined to be equal to or greater than the first range.

In a case in which the posture difference between the avatar posture $pos_a$ and the actual posture $pos_u$ of the user is determined not to be equal to or greater than the first range in step S5, the process returns to step S3, and the process of steps S3 to 35 described above is repeated. Accordingly, in a case in which the posture difference between the avatar posture $pos_a$ and the actual posture $pos_u$ of the user is smaller than the first range, the avatar viewpoint image from the viewpoint of the avatar is displayed as the presentation image, resulting in presentation image posture $pos_v$=avatar posture $pos_a$.

Conversely, in a case in which the posture difference between the avatar posture $pos_a$ and the actual posture $pos_u$ of the user determined to be equal to or greater than the first, range in step S5, the process proceeds to step S6. Then the presentation image generation unit 74 generates the reduction processing image for reducing discomfort such as "VR sickness" as a presentation image, providing the generated image to the display unit 42 to cause the display unit 42 to display the supplied image.

The presentation image generation unit 74 generates, for example, an image corresponding to the user posture $pos_a$ as the reduction processing image and causes the display unit 42 to display the generated image. In this case, the presentation image posture $pos_v$ is the user posture $pos_u$.

$$pos_v=(x_v,y_v,z_v,\theta_v,\varphi_v)=(x_u,y_u,z_u,\theta_u,\varphi_u)$$

Alternatively, the presentation image generation unit 74 generates, for example, an image with the head position of the avatar posture $pos_a$ for the head position of the presentation image posture $pos_v$, or an image with the gaze direction of the user posture $pos_u$ for the gaze direction of the presentation image posture $pos_v$, as the reduction processing image and causes the display unit 42 to display the generated image. That is, the presentation image posture $pos_v$ is as follows.

$$pos_v=(x_v,y_v,z_v,\theta_v,\varphi_v)=(x_a,y_a,z_a,\theta_a,\varphi_a)$$

Alternatively, the presentation image generation unit 74 generates, for example, an image with the head position and the azimuth angle $\theta$ of the avatar posture $pos_a$ for the head position and the azimuth angle $\theta$ of the presentation image posture $pos_v$, or an image with the elevation angle $\varphi$ of the user posture $pos_u$ for the elevation angle $\varphi$ of the presentation image posture $pos_v$, as the reduction processing image and causes the display unit 42 to display the generated image. That is, the presentation image posture $pos_v$ is as follows.

$$pos_v=(x_v,y_v,z_v,\theta_v,\varphi_v)=(x_a,y_a,z_a,\theta_a,\varphi_u)$$

This equation means that, since the user is more likely to get sick with the field of view unintentionally changed in the vertical direction, the gaze direction of the user is adopted only in this direction.

In contrast, for example, as the reduction processing image, an image with the head position and the elevation angle $\varphi$ of the avatar posture $pos_a$ for the head position and the elevation angle $\varphi$ of the presentation image posture $pos_v$, or an image with the azimuth angle $\theta$ of the user posture $pos_u$ for the azimuth angle $\theta$ of the presentation image posture $pos_v$, may be generated to be displayed. That is, the presentation image posture $pos_v$ is as follows.

$$pos_v=(x_v,y_v,z_v,\theta_v,\varphi_v)=(x_a,y_a,z_a,\theta_a,\varphi_a)$$

This means that the gaze direction of the user is adopted only for the azimuth angle $\theta$.

Then, in step S7, the presentation image generation unit 74 determines whether or not the posture difference between the avatar posture $pos_a$ and the actual posture $pos_u$ of the user is within a predetermined second range.

At step S7, in a case in which the posture difference between the avatar posture $pos_a$ and the actual posture $pos_u$ of the user is not yet within the second range, that is, the posture difference between the avatar posture $pos_a$ and the actual posture $pos_a$ of the user is determined to be greater than the second range, the process returns to step S6, and the above-described process is repeated. That is, the reduction processing image is continuously generated as the presentation image and displayed on the display unit 42.

Conversely, in a case in which the posture difference between the avatar posture $pos_a$ and the actual posture $pos_u$ of the user is determined to be within the second range in step S7, the process proceeds to step S8, and the presentation image generation unit 74 generates the reduction processing image so as to gradually approach the avatar viewpoint image (an image corresponding to the avatar posture $pos_a$), then causes the display unit 42 to display the generated image. After the process of step S8, presentation image posture $pos_v$=avatar posture $pos_a$=user posture $pos_u$.

For control of the presentation image posture $pos_v$ that brings the presentation image (reduction processing image) continuously close to the avatar viewpoint image, which is the process of step S8, for example, calculations according to simple linear motion, curvilinear motion such as Bezier, or motion within the drive range allowed by geometric constraints based on a body model may be used.

After step S8, the process returns to step S3, and the above-described steps S3 to S8 are executed again. The values of the first range and the second range may be the same value or different values.

The above process is executed as a presentation image generation process.

As described above, in the presentation image generation process by the image system 1, is a case in which the posture difference between the avatar posture $pos_a$ and the actual posture $pos_u$ of the user is smaller than the predetermined threshold (the first range), the presentation image generation unit 74 generates the avatar viewpoint image according to the viewpoint of the avatar (an image corresponding to the avatar posture $pos_a$) as the first presentation image, and causes the display unit 42 to display the generated image. In a case in which the posture difference between the avatar posture $pos_a$ and the actual posture $pos_u$ of the user is equal to or greater than a predetermined threshold (first range) as well as the posture difference between the avatar posture $pos_a$ and the actual posture $pos_u$ of the user occurs above a certain level, the presentation image generation unit 74 generates the reduction processing image different from the avatar viewpoint image as the second presentation image and causes the display unit 42 to display the generated image. This system enables reduction of the discomfort of the user such as "VR sickness."

Note that, in the generation of the reduction processing image in step S6 described above, the reduction processing image is generated and displayed using the content image in the virtual world. The image different from the content image being displayed, for example, a black image (blackout screen) in which the entire screen is black only, or an alert screen that explains the screen being changed in order to prevent "sickness," may be displayed.

In this case, in the process executed in step S8 to bring the image continuously close to the avatar viewpoint image, the image may be returned to the avatar viewpoint image by using an alpha blending process, etc. in which alpha blending of the black image and the avatar viewpoint image is performed.

Assuming that the avatar viewpoint image is $I_a$ and the black image is $I_b$, the reduction processing image $I_u$ in step S8 is expressed by the following equation (9) using a blending ratio $\alpha$ ($0 \leq \alpha \leq 1$).

$$I_u=\alpha I_a+(1-\alpha)I_b \qquad (9)$$

By changing the blending ratio $\alpha$ in the equation (9) continuously from 0 to 1 over time, the black image may be controlled so as to gradually return to the original avatar viewpoint image.

<Example of the Content where a Plurality of the Users Shares the Virtual World>

Although the above-described example is an example where one user experiences the virtual world, there is a case in which the same virtual world may be shared and experienced by a plurality of the users.

Figure 7:
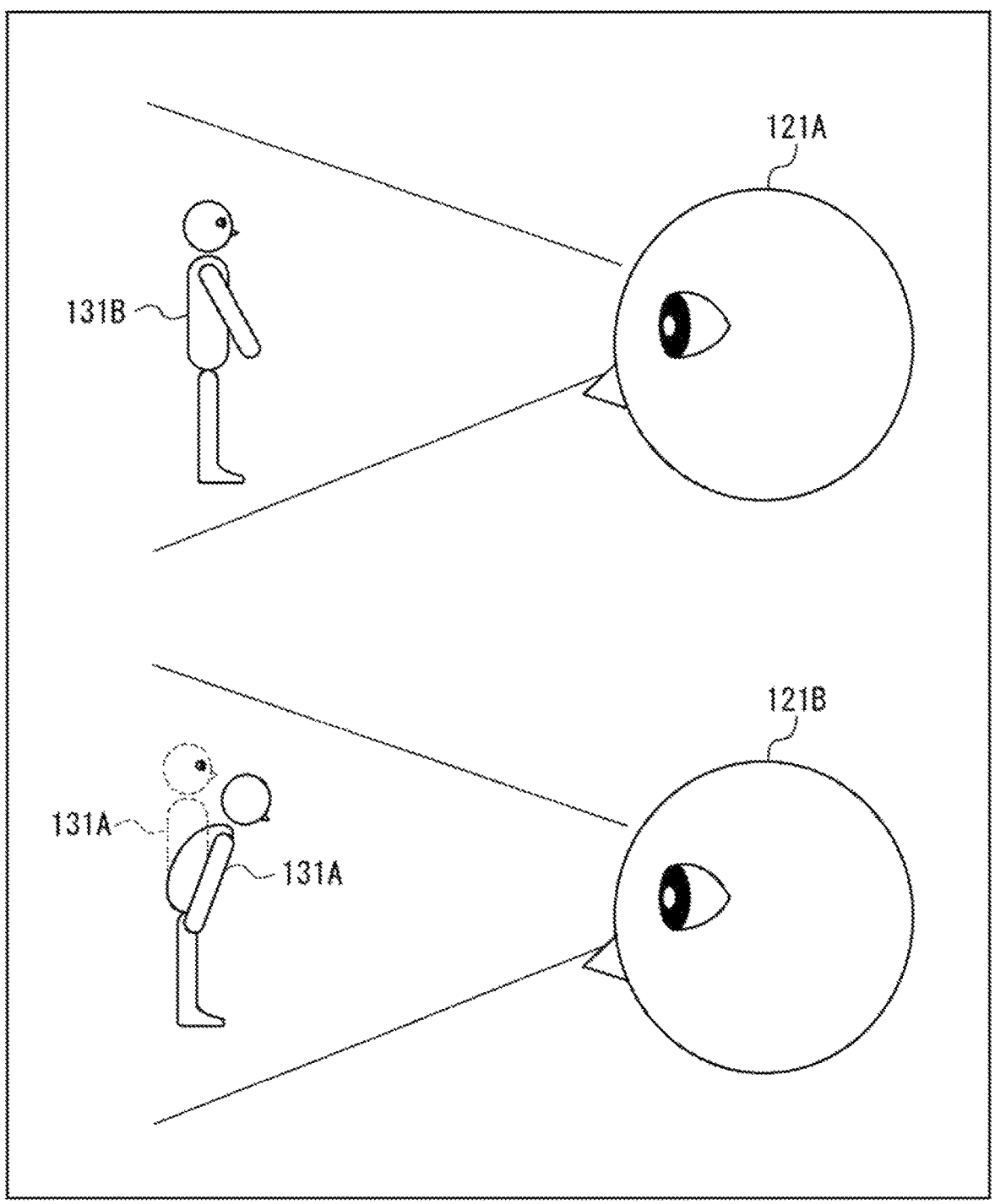
FIG. 7 illustrates a figure explaining an example of contents in which a plurality of users shares a virtual world.

For example, as illustrated in FIG. 7, the scene is assumed that, on the virtual world (presentation image) displayed on the HMD 11 of one user 121A, the avatar 131B of the other user 121B is displayed, while, on the virtual world (presentation image) displayed on the HMD 11 of the other user 121B, the avatar 131A of one user 121A is displayed.

The avatar 131A of the user 121A operates on the virtual world on the basis of the sensor detection result of the user 121A. The avatar 131B of the user 121B operates on the virtual world on the basis of the sensor detection result of the user 121B.

Therefore, the avatar 131 (131A and 131B) performs basically the same motion as the operation of the user 121 (121A and 121B), but an operation that does not match the operation of the user 121 may be performed as the design of the content.

For example, a scene where the user 121A causes the avatar 131A of the user 121A to bow a greeting is described below.

Although the actual user 121A may perform a bow operation, the avatar 131A at which the user 121B looks in the virtual world may be caused to perform the bow operation since the user 121B may not see the actual appearance of the user 121A. Therefore, the user 121A performs an operation instruction for causing the avatar 131A to bow by handling the controller 13, voice input, etc.

In such a scene, a situation described above occurs in which the user posture $pos_u$ and the avatar posture $pos_a$ are different, so that the presentation image generation process described in FIG. 6 may be similarly applied.

That is, when the user 121A instructs the bowing operation with the handling buttons, etc., the presentation image is displayed in which the avatar 131A of the user 121A performs the bowing operation on the display unit 42 of the HMD 11 worn by the user 121B. When the avatar 131A of the user 121A performs the bowing operation, the posture difference between the avatar posture $pos_a$ and the actual posture $pos_a$ of the user 121A becomes equal to or greater than the first range. Then, as the process of step S6 in FIG. 6, the presentation image generation unit 74 generates the reduction processing image and causes the display unit 42 of the HMD 11 worn by the user 121A to display the reduction processing image. In other words, when the avatar viewpoint image according to the viewpoint of the avatar 131A performing the bow operation is displayed on the display unit 42 of the HMD 11 worn by the user 121A, the view change is large, and "sickness" occurs, so that the image is switched to the reduction processing image.

Then, when the bowing operation is finished and the posture difference between the avatar posture $pos_a$ and the actual posture $pos_u$ of the user 121A becomes within the second range, the avatar posture $pos_a$ of the avatar 131A of the presentation image is controlled so as to gradually approach the actual posture $pos_u$ of the user 121A as the process of step 38 in FIG. 6.

In a case in which, what operation the user 121 causes the user's own avatar 131 to perform is a selectable operation command, whether or not to present the reduction processing image for each operation command is determined in advance, and the presentation image prepared in advance may be displayed in response to the instructed operation command. Thus, by displaying the image different from the viewpoint image of the avatar in response to the operation command in a case in which the posture difference between the actual posture $pos_u$ of the user based on the detection result of detecting the motion of the user and the avatar posture $pos_a$ occurs, the VR sickness may be suppressed.

<Exemplary Configuration of a Computer>

The above-described series of processes may be executed by hardware or software. In a case in which the series of processes are executed by software, a program that configures the software is installed on a computer. Here, the computer includes, for example, a microcomputer incorporated in dedicated hardware, and a general-purpose personal computer capable of executing various functions by installing various programs.

Figure 8:
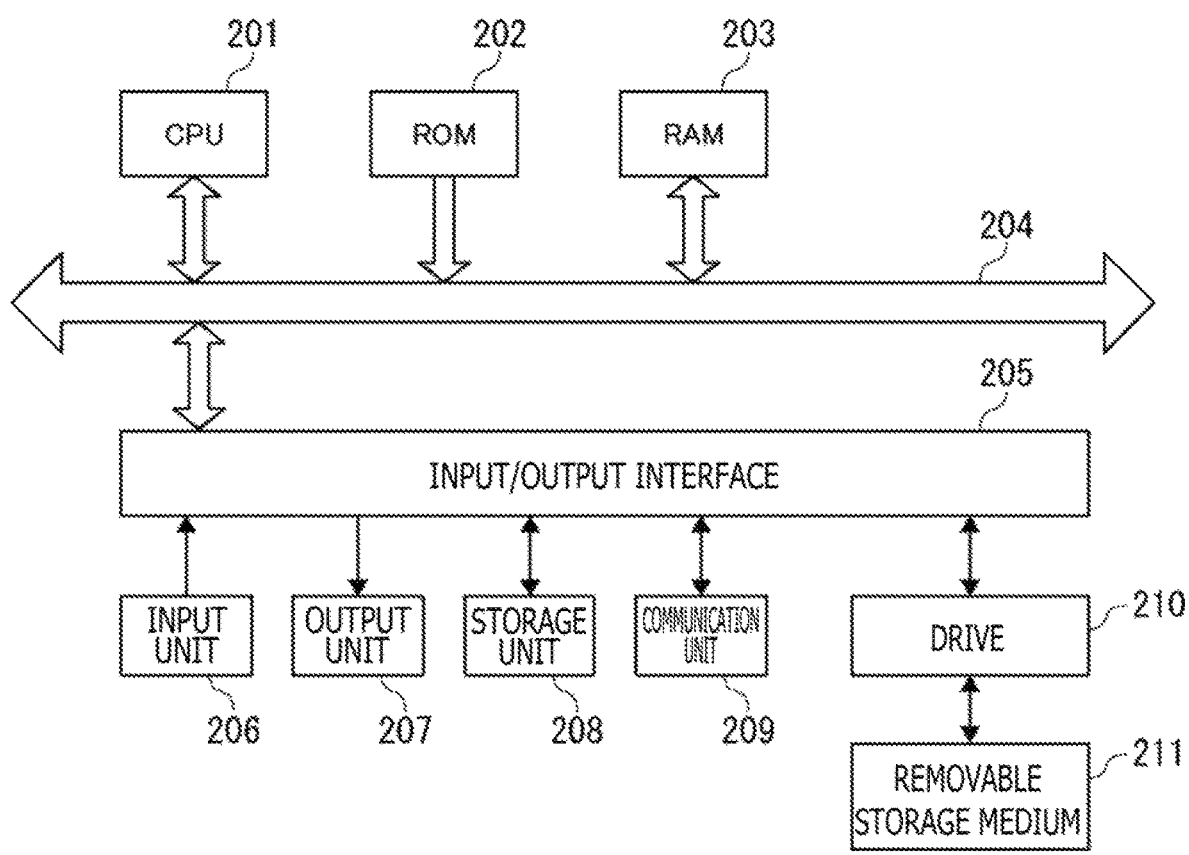
FIG. 8 illustrates a block diagram representing an exemplary configuration of an embodiment of a computer to which the present technique is applied.

FIG. 8 illustrates a block diagram representing an exemplary configuration of a hardware configuration of a computer that executes the above-described series of processes by a program.

In the computer, a CPU (Central Processing Unit) 201, a ROM (Read Only Memory) 202, and a RAM (Random Access Memory) 203 are mutually connected by a bus 204.

Further, an input/output interface 205 is connected to the bus 204. An input unit 206, an output unit 207, a storage unit 208, a communication unit 209, and a drive 210 are connected to the input/output interface 205.

The input unit. 206 includes a keyboard, a mouse, a microphone, etc. The output unit 207 includes a display, a speaker, etc. The storage unit 208 includes a hard disk, a non-volatile memory, etc. The communication unit 209 includes a network interface etc. The drive 210 drives a removable recording medium 211 such as a magnetic disk, an optical disk, a magneto-optical disk, or a semiconductor memory.

In the computer configured as described above, for example, the CPU 201 loads the program stored in the storage unit 208 into the RAM 203 via the input/output interface 205 and the bus 204, and then executes the program, so that the series of processes described above are executed.

In the computer, the program may be installed in the storage unit 208 via the input/output interface 205 by attaching the removable recording medium 211 to the drive 210. In addition, the program may be received by the communication unit 209 via a wired or wireless transmission medium such as a local area network, the Internet, or digital satellite broadcasting, and then may be installed in the storage unit 208. In addition, the program may be installed in advance in the ROM 202 or the storage unit 208.

In addition, the program executed by the computer may be a program that performs processing in chronological order according to the order described in this specification. The program may also be a program that performs processing in parallel, or at necessary timing such as when a call is made.

The steps described in the flowchart may be, of course, performed in the case of chronological order according to the described order. Even if the processing is not performed necessarily in chronological order, the steps may also be executed in parallel, or at necessary timing such as when a call is made.

In this specification, system means a set of a plurality of components (devices, modules (parts), etc.), and it does not matter whether all the components are in the same housing or not. Therefore, a plurality of devices housed in separate housings and connected via a network, and one device housing a plurality of modules in one housing are all systems.

The embodiments of the present technique are not limited to the above-described embodiments, and various modifications may be made without departing from the scope of the present technique.

Although the example of the head mounted display (HMD) has been demonstrated as a display device which displays the presentation image presented to the user in the embodiment mentioned above, the head up display (HUD) or a dome-shaped (hemispherical) display etc. may be sufficient as the display device of the imaging system 1. A display device that displays a video so as to cover the field of view of the user may also be sufficient.

For example, a form in which some of the above-described embodiments are combined as appropriate may be employed.

The present technique may have a cloud computing configuration in which one function is shared and processed in cooperation with one another by a plurality of devices via a network.

Further, each step described in the above-described flowchart may be executed by one device or may be executed in a shared manner by a plurality of devices.

Furthermore, in a case in which a plurality of processes are included in one step, the plurality of processes included in the one step may be executed in a shared manner by a plurality of devices in addition to being executed by one device.

The effects described in the present specification are merely examples and are not limited, and effects other than those described in the present specification may be obtained.

In addition, the present technique may also have the following configurations.

(1) An image processing device including:

an image generation unit configured to generate an avatar viewpoint image according to a viewpoint of an avatar corresponding to a user in a virtual world as a first presentation image to be presented to the user, and generate a second presentation image different from the avatar viewpoint image in a case in which a posture difference occurs between an actual posture of the user based on a result of detecting motion of the user and a posture of the avatar.

(2) The image processing device according to (1), in which the posture is defined by a head position and a gaze direction, and the image generation unit generates the second presentation image different from the avatar viewpoint image in a case in which a difference in azimuth angle or elevation angle between the actual posture of the user and the posture of the avatar is equal to or greater than a first threshold.

(3) The image processing device according to (1), in which the posture is defined by a head position and a gaze direction, and the image generation unit generates the second presentation image different from the avatar viewpoint image in a case in which a difference in azimuth angle or elevation angle between the actual posture of the user and the posture of the avatar is equal to or greater than a first threshold, or in a case in which a difference in a head position between the actual posture of the user and the posture of the avatar is equal to or greater than a first threshold.

(4) The image processing device according to any one of the above (1) to (3), in which the second presentation image includes an image corresponding to a posture of the user.

(5) The image processing device according to any one of the above (1) to (3), in which the second presentation image includes an image corresponding to a head position of the posture of the avatar and a gaze direction of a posture of the user.

(6) The image processing device according to any one of the above (1) to (3), in which the second presentation image includes an image corresponding to a head position and an azimuth angle of the posture of the avatar, and an elevation angle of a posture of the user.

(7) The image processing device according to any one of the above (1) to (3), in which the second presentation image includes an image corresponding to a head position and an elevation angle of the posture of the avatar, and an azimuth angle of a posture of the user.

(8) The image processing device according to any one of the above (1) to (7), in which the image generation unit generates the second presentation image different from the avatar viewpoint image when a case in which the posture difference between the actual posture of the user and the posture of the avatar is equal to or greater than a first threshold occurs for a predetermined number of times or continuously for a predetermined period of time.

(9) The image processing device according to any one of the above (1) to (8), in which the image generation unit further generates the second presentation image so as to gradually approach the avatar viewpoint image in a case in which the posture difference between the actual posture of the user and the posture of the avatar is within a second threshold.

(10) The image processing device according to any one of the above (1) to (9), further including:

a handling unit configured to instruct an operation of the avatar corresponding to the user, in which the image generation unit generates the second presentation image different from the avatar viewpoint image in a case in which the posture difference occurs between the actual posture of the user and the posture of the avatar by operating the avatar in response to an instruction from the handling unit.

(11) An image processing method including the step of:

by an image processing device, generating an avatar viewpoint image according to a viewpoint of an avatar corresponding to a user in a virtual world as a first presentation image to be presented to the user and generating a second presentation image different from the avatar viewpoint image in a case in which a posture difference occurs between an actual posture of the user based on a result of detecting motion of the user and a posture of the avatar.

(12) An image system including:

an image generation unit configured to generate an avatar viewpoint image according to a viewpoint of an avatar corresponding to a user in a virtual world as a first presentation image to be presented to the user, and generate a second presentation image different from the avatar viewpoint image in a case in which a posture difference occurs between an actual posture of the user based on a result of detecting motion of the user and a posture of the avatar; and a display unit configured to display the first presentation image and the second presentation image.

REFERENCE SIGNS LIST

1 Image system, 11 HMD, 12 image processing device, 13 Controller, 41 Sensor, 42 Display unit, 62 Image generation unit, 71 Avatar operation control unit, 72 User posture detection unit, 73 Posture difference calculation unit, 74 Presentation image generation unit, 81 Handling unit, 201 CPU, 202 ROM, 203 RAM, 206 Input unit, 207 Output unit, 208 Storage unit, 209 Communication unit, 210 Drive

The invention claimed is:

1. An image processing device comprising:

an image generation unit configured to generate an avatar viewpoint image according to a viewpoint of an avatar corresponding to a user in a virtual world as a first presentation image to be presented to the user, and generate a second presentation image different from the avatar viewpoint image in a case in which a posture difference occurs between an actual posture of the user based on a result of detecting motion of the user and a posture of the avatar, wherein the actual posture and the posture of the avatar are each defined by a plurality of parameters, wherein the first presentation image includes an image corresponding to each parameter of the plurality of parameters defining the posture of the avatar and the second presentation image includes an image not corresponding to each parameter of the plurality of parameters defining the posture of the avatar, and wherein the image generation unit is implemented via at least one processor.

2. The image processing device according to claim 1, wherein the plurality of parameters include a head position and a gaze direction, and the image generation unit generates the second presentation image different from the avatar viewpoint image in a case in which a difference in azimuth angle or elevation angle between the actual posture of the user and the posture of the avatar is equal to or greater than a first threshold.

3. The image processing device according to claim 1, wherein the plurality of parameters include a head position and a gaze direction, and the image generation unit generates the second presentation image different from the avatar viewpoint image in a case in which a difference in azimuth angle or elevation angle between the actual posture of the user and the posture of the avatar is equal to or greater than a first threshold, or in a case in which a difference in a head position between the actual posture of the user and the posture of the avatar is equal to or greater than a first threshold.

4. The image processing device according to claim 1, wherein the second presentation image includes an image corresponding to a posture of the user.

5. The image processing device according to claim 1, wherein the second presentation image includes an image corresponding to a head position of the posture of the avatar and a gaze direction of a posture of the user.

6. The image processing device according to claim 1, wherein the second presentation image includes an image corresponding to a head position and an azimuth angle of the posture of the avatar, and an elevation angle of a posture of the user.

7. The image processing device according to claim 1, wherein the second presentation image includes an image corresponding to a head position and an elevation angle of the posture of the avatar, and an azimuth angle of a posture of the user.

8. The image processing device according to claim 1, wherein the image generation unit generates the second presentation image different from the avatar viewpoint image when a case in which the posture difference between the actual posture of the user and the posture of the avatar is equal to or greater than a first threshold occurs for a predetermined number of times or continuously for a predetermined period of time.

9. The image processing device according to claim 1, wherein the image generation unit further generates the second presentation image so as to gradually approach the avatar viewpoint image in a case in which the posture difference between the actual posture of the user and the posture of the avatar is within a second threshold.

10. The image processing device according to claim 1, further comprising:

a handling unit configured to instruct an operation of the avatar corresponding to the user, wherein the image generation unit generates the second presentation image different from the avatar viewpoint image in a case in which the posture difference occurs between the actual posture of the user and the posture of the avatar by operating the avatar in response to an instruction from the handling unit.

11. An image processing method comprising:

generating an avatar viewpoint image according to a viewpoint of an avatar corresponding to a user in a virtual world as a first presentation image to be presented to the user and generating a second presentation image different from the avatar viewpoint image in a case in which a posture difference occurs between an actual posture of the user based on a result of detecting motion of the user and a posture of the avatar;

wherein the actual posture and the posture of the avatar are each defined by a plurality of parameters, and wherein the first presentation image includes an image corresponding to each parameter of the plurality of parameters defining the posture of the avatar and the second presentation image includes an image not corresponding to each parameter of the plurality of parameters defining the posture of the avatar.

12. An image system comprising:

an image generation unit configured to generate an avatar viewpoint image according to a viewpoint of an avatar corresponding to a user in a virtual world as a first presentation image to be presented to the user, and generate a second presentation image different from the avatar viewpoint image in a case in which a posture difference occurs between an actual posture of the user based on a result of detecting motion of the user and a posture of the avatar; and a display configured to display the first presentation image and the second presentation image, wherein the actual posture and the posture of the avatar are each defined by a plurality of parameters, wherein the first presentation image includes an image corresponding to each parameter of the plurality of parameters defining the posture of the avatar and the second presentation image includes an image not corresponding to each parameter of the plurality of parameters defining the posture of the avatar, and wherein the image generation unit is implemented via at least one processor.

13. A non-transitory computer-readable medium having embodied thereon a program, which when executed by a computer causes the computer to execute an image processing method, the method comprising:

generating an avatar viewpoint image according to a viewpoint of an avatar corresponding to a user in a virtual world as a first presentation image to be presented to the user and generating a second presentation image different from the avatar viewpoint image in a case in which a posture difference occurs between an actual posture of the user based on a result of detecting motion of the user and a posture of the avatar, wherein the actual posture and the posture of the avatar are each defined by a plurality of parameters, and wherein the first presentation image includes an image corresponding to each parameter of the plurality of parameters defining the posture of the avatar and the second presentation image includes an image not corresponding to each parameter of the plurality of parameters defining the posture of the avatar.

* * * * *